United States Patent [19]

Skyba

[11] Patent Number: 4,694,541
[45] Date of Patent: Sep. 22, 1987

[54] ELASTIC TIE-DOWN WITH ROPE ADJUSTMENT MEANS

[76] Inventor: Helmut K. Skyba, Rte. 2, Box 330, Wild Rose, Wis. 54984

[21] Appl. No.: 888,337

[22] Filed: Jul. 23, 1986

[51] Int. Cl.$^4$ ............................................. A44B 13/02
[52] U.S. Cl. ....................................... 24/301; 24/300; 24/371
[58] Field of Search ................. 24/301, 298, 302, 338, 24/339, 343, 371, 372, 688

[56] References Cited

U.S. PATENT DOCUMENTS

| | | | |
|---|---|---|---|
| 393,595 | 11/1888 | Veatch | 24/298 |
| 1,153,334 | 9/1915 | Oswald | 24/300 |
| 1,420,027 | 6/1922 | Johanson et al. | 24/371 |
| 1,578,817 | 3/1926 | Fischer | 24/300 |
| 1,595,630 | 8/1926 | Stockton | 24/371 |
| 1,696,220 | 12/1928 | Townsend | 24/301 |
| 2,499,077 | 2/1950 | Roysher | 24/371 |
| 2,861,311 | 11/1958 | Kurland | 24/371 |
| 2,991,524 | 7/1961 | Dobrikin | 24/371 |
| 3,231,950 | 2/1966 | Lummis | 24/371 |
| 3,636,594 | 1/1972 | Faivre | 24/298 |

Primary Examiner—Victor N. Sakran
Attorney, Agent, or Firm—Fuller, Puerner & Hohenfeldt

[57] ABSTRACT

An elastic tie-down comprises as inelastic rope having enlargements thereon that are captured by an elastic sleeve. The elastic sleeve is shorter than the spacing between the rope enlargements. Pulling the rope ends causes the rope enlargements to bear against the sleeve ends and stretch the sleeve. The rope ends are provided with hooks. The length between the hooks is adjustable without affecting the elastic properties of the tie-down by a clip that slidably receives the standing end of one of the rope ends extending from the sleeve. The clip also secures the rope end, thereby creating an adjustable sized loop in the rope. A hook is slidably received over the rope in the loop. Sliding the clip along the rope standing end varies the size of the loop and thereby alters the length between the two hooks independently of the tension in the elastic sleeve.

10 Claims, 6 Drawing Figures

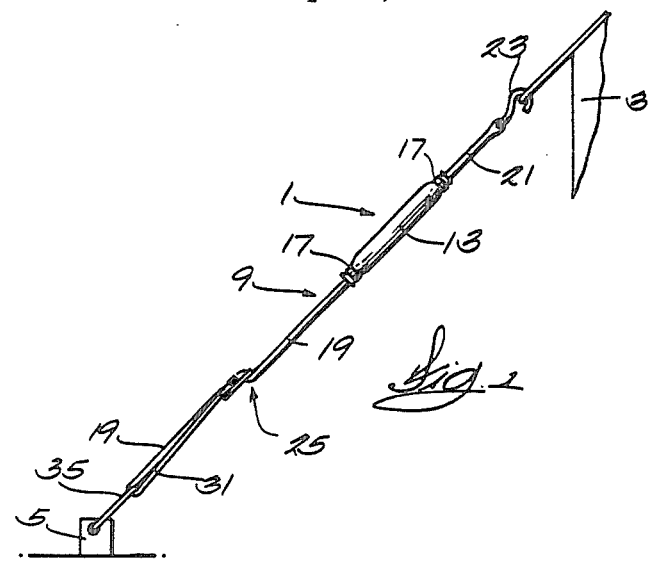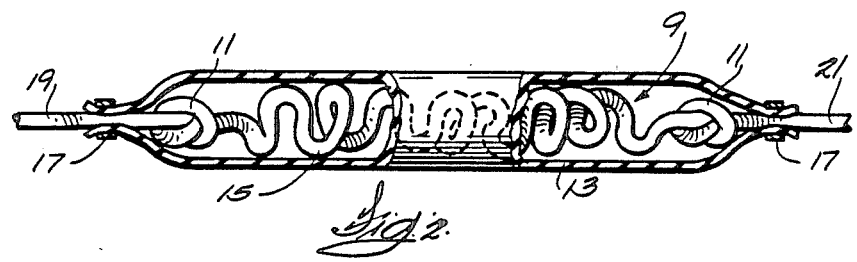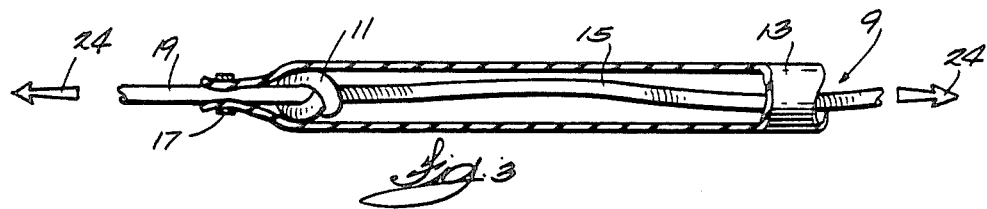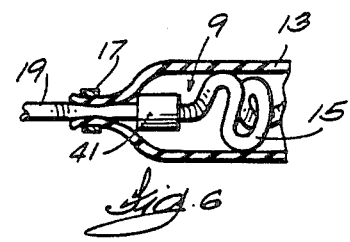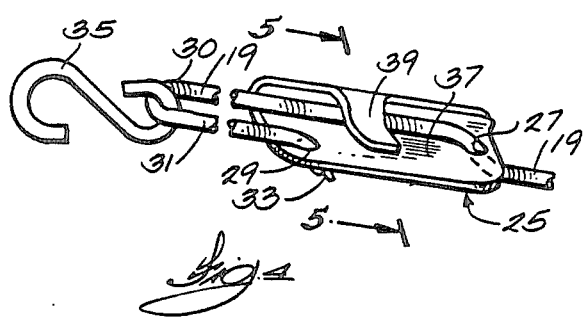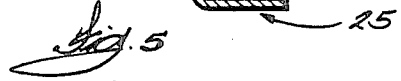

ELASTIC TIE-DOWN WITH ROPE ADJUSTMENT MEANS

BACKGROUND OF THE INVENTION

1. Field of the Invention

This invention pertains to restraining devices, and more particularly to apparatus for yieldably restraining a first member against motion away from a second member.

2. Description of the Prior Art

Yieldable tie-downs, sometimes referred to as shock cords, are in widespread use. Such devices find numerous applications in the automotive, recreational and marine fields for retaining a first member in a desired location relative to a second member.

Typically, prior elastic tie-downs comprised an elongated flexible element with a hook attached to each end. The flexible element is usually a rubber strap or elasticized cord that is stretchable along its full length. Full length elasticity results in a tie-down having a restraining force that is dependent on the distance between the hooks. That construction poses certain disadvantages. If the tie-down is slightly too long for the application, the tie-down will be too limber. The only way to obtain increased tension or restraining force is by stretching the tie-down to increase the distance between the hooks. However, such stretching is undesirable because then the distance between the hooks increases even more, and the excess length must be taken up. On the other hand, if the tie-down is slightly too short for the application, the tie-down must be excessively stretched, which may produce unwanted force in the restrained members. Further, excessive stretching can result in permanent elongation or deformation. In addition, full length elastic material is undesirably expensive. Even if the tie-down length between the hooks is correct for the application at hand, the tension produced by that length may be improper. In that case, some way must be found to change either the distance between the restrained members or the overall length of the tie-down to obtain the proper tension.

As a result of the length-tension dependency of prior tie-downs, a user must buy several sizes for his various applications. Alternately, he must buy a tie-down that is excessively long for most applications and devise ways of adapting it to applications requiring shorter lengths.

Thus, a need exists for an elastic tie-down that produces a restraining force that is independent of the distance between the end hooks.

SUMMARY OF THE INVENTION

In accordance with the present invention, an adjustable length tie-down is provided that produces a proper restraining force for all applications. This is accomplished by apparatus that includes an elastic sleeve having opposed ends that capture enlarged portions of an elongated inelastic element passing through the sleeve.

The tie-down inelastic element may be a conventional flexible rope. The elastic sleeve passes over the rope. The rope is knotted at two locations farther apart than the length of the sleeve. The two knots with the slack rope therebetween are inserted into the sleeve. The sleeve ends are crimped tightly over the rope, thereby capturing the two knots and the rope slack within the sleeve. Pulling the rope ends causes the two knots to stretch the tube, thereby imparting apparent elastic qualities to the rope. In the preferred construction, the distance between the two rope knots is chosen to equal the maximum permissible length of the stretched sleeve. A hook may be fastened to a first end of the rope. The length of the rope is selected so that the rope will limit the elongation of the rubber prior to failure of the rubber. Hence the length of the rope can be preselected to provide a certain elastic tension or pull before the rope takes over. The rope thus provides a safety in the event of over-stressing and breakage of the elastic member. The capability of pre-selecting the elastic tension by adjustment of the rope length enables the user of the tie-down to determine when the tension or pull is exceeded for certain specified uses. For example, if the specifications for holding helicopter blades of a deck-carried helicopter are 70 lbs. of tension, and a tie-down is designed for that tension and "bottoms out", i.e., all the slack in the rope is taken up, the user will know that the tie-down tension is likely to exceed the specifications.

Further in accordance with the present invention, the tie-down is adjustable in length without affecting the tension in the sleeve. For that purpose, the second end of the rope is passed through and fastened to a clip having a pair of laterally and longitudinally spaced holes. The rope standing end adjacent the elastic sleeve passes through one clip hole and is folded back to form a loop, and the rope running end thereby created is fastened to the clip second hole. A hook may be carried by the rope loop. With tension exerted between the two hooks, the clip is firmly held in place on the rope standing end. With tension removed, the clip is easily slid in either direction along the rope standing end to increase or decrease the length between the two hooks without affecting the elastic properties of the sleeve.

Other objects and advantages of the invention will become apparent to those skilled in the art from reading the disclosure.

BRIEF DESCRIPTION OF THE DRAWINGS

FIG. 1 is a side view of the elastic tie-down of the present invention in operation to yieldable retain a first member to a second member;

FIG. 2 is a partial cross-sectional view taken through the elastic sleeve of the tie-down of the present invention when in the relaxed condition;

FIG. 3 is a view similar to FIG. 2 but showing the elastic sleeve in the stretched operative condition;

FIG. 4 is a perspective view of the shortening clip of the elastic tie-down of the present invention;

FIG. 5 is a cross-sectional view taken along lines 5—5 of FIG. 4; and

FIG. 6 is a cross-sectional view similar to FIG. 2 but showing a modified embodiment of the present invention.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

Referring to FIG. 1, an elastic tie-down 1 is illustrated that includes the present invention. The elastic tie-down is particularly useful for yieldably restraining a first member 3 against movement away from a second member 5. However, it will be understood that the invention is not limited to retaining applications.

The elastic tie-down 1 includes an elongated flexible string or rope 9 of any suitable inelastic material.

Referring to FIG. 2, a pair of enlargements, such as knots 11 are formed in the rope 9. A sleeve 13 of elastic material is slid over the rope. The length of the sleeve 13 is preferably about 3 to 4 inches, and the distance between the two knots is greater than the length of the sleeve. The sleeve is positioned over the rope such that the two knots and the rope slack portion 15 between the knots lie within the sleeve. Both sleeve ends are then crimped tightly over the rope, as with split rings 17. As a result, the knots and slack 15 are captured inside the sleeve, and the rope is divided into a first standing end 19 and a second standing end 11 that extend in opposite directions from the sleeve. To aid the tie-down 1 grip a member 3, the second standing end 21 is fastened to a conventional hook 23, FIG. 1.

Referring to FIG. 3, arrows 24 represent a tension applied to the rope standing ends 19 and 21. Because the knots 11 are captured within the sleeve 13, the sleeve stretches, and the slack 15 is taken up. The distance between the knots limits the amount of stretch to prevent overstretching or breaking. The preferred material for the sleeve is a strong surgical tubing. Surgical tubing having an outer diameter of about 0.68 inches and a wall thickness of about 0.09 inches gives satisfactory results. Tie-downs that may be used extensively outdoors preferably have sleeves made from a material that is resistant to ultra-violet rays.

Further in accordance with the present invention, the overall length of the elastic tie-down 1 is easily adjustable without affecting the tie-down elastic properties. Adjustability is provided by means of a flat clip plate 25 having laterally and longitudinally spaced holes 27 and 29. See FIG. 4. The rope first standing end 19 passes through the hole 27 and is turned back to form a loop 30, thus creating a rope running end 31. The running end 31 is fastened to the clip, as by means of the hole 29. For example, the running may pass through the hole 29 and terminate in a knot 33. In the illustrated construction, the loop 30 passes slidably through the eye of a hook 35. Sliding the clip along standing end 19 varies the size of the loop 30 and thereby adjusts the length between the hooks 23 and 35 independently of any tension in the tie-down. The lateral spacing between the holes 27 and 29 allows the rope ends 19 and 31 to lie neatly side-by-side. The longitudinal spacing between the clip holes increases the binding action of the clip on the rope. To neatly hold the second running end adjacent the clip flat surface 37, the clip preferably is fabricated with a bentover tab or spring finger 39. As best shown in FIG. 5, the clip tab 39 is formed to permit free longitudinal sliding of the clip along the standing end 19, but to generally prevent rope lateral movement relative to the clip surface 37 or to the running end 31.

Referring to FIG. 6, a modified embodiment of the present invention is illustrated. In FIG. 6, the slack 15 of the rope 9 is captured within the sleeve 13 by means of enlargements that comprise collapsible collars 41 that are tightly crimped to the rope. The collars 41 function in the same manner as the knots 11 previously described.

In operation, it will be assumed that member 3, which may be, for example, a tarpaulin, is to be retained to a member 5, which may be a truck lug, by the elastic tie-down of the present invention. The clip 35 is slid along standing end 19 until the hooks 23 and 35 are insertable through appropriate openings in the two members. The first standing end 19 adjacent the sleeve is pulled away from the member 3, thereby stretching the sleeve 13, until the desired tension 24 is produced. The clip 25 is slid toward the sleeve along standing end 19 until the desired tension remains in the sleeve upon release. The tension may be easily increased or reduced merely by sliding the clip toward or away from the sleeve. Consequently, the tension in the tie-down 1 is adjustable without changing the distance between the hooks. Alternately, the tie-down of the present invention is adjustable between a wide range of distances between the hooks independently of the tie-down tension. The clip 25 can be employed without the tie-down assembly on any rope if appropriately sized.

Thus, it is apparent that there has been provided, in accordance with the invention, an elastic tie-down with rope adjusting means that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:
1. A tie-down comprising:
   a. a flexible rope having first and second ends and a pair of spaced abutment means on the rope between the two ends; and
   b. an elastic sleeve placed over the rope intermediate the rope ends, and encapsulating and concealing said abutment means enlargements, the sleeve length being less than the spacing between the rope abutment means to create a rope slack inside the sleeve, the sleeve being crimped tightly at the ends thereof over the rope to grip the rope and capture said abutment means and rope slack between the sleeve ends and to create rope first and second ends extending oppositely from the ends of the sleeve and having sufficient length to afford connection of said rope ends for rope usage,
   so that applying tension to the rope ends causes said abutment means to cause tension on said elastic sleeve to stretch and thereby impart elastic qualities to the tie-down.

2. The tie-down of claim 1 wherein said abutment means is dimensioned to prevent said rope from being pulled through said sleeve crimped opening.

3. The tie-down of claim 2 wherein said abutment means are not fixedly connected to said sleeve.

4. The tie-down of claim 1 further comprising a clip having a longitudinally extending flat surface for adjusting the length between the two rope ends independently of the tension produced in the elastic sleeve, the clip having first and second holes with substantially parallel axes through the flat surface, the rope second end being fastened to the clip at the second clip hole, the first clip hole being adapted to slidably receive the rope intermediate the elastic sleeve and the second rope end,
   so that a loop is formed in the rope portion extending between the first and second clip holes.

5. The tie-down of claim 4 wherein:
   a. the first and second clip holes in the substantially flat surface are laterally and longitudinally offset; and b. the clip is fabricated with a tab bent laterally over the flat intermediate surface to loosely guide the rope intermediate the sleeve and the second rope end for permitting longitudinal sliding of the clip along the rope and for generally preventing rope lateral movement with respect to the clip.

6. The tie-down of claim 1 wherein the elastic sleeve is made of surgical tubing.

7. The tie-down of claim 6 wherein the surgical tubing has a length of approximately 3 to 4 inches, an outer diameter of approximately 0.68 inches and a wall thickness of approximately 0.09 inches.

8. The tie-down of claim 1 wherein said rope is a wire rope.

9. The tie-down of claim 1 further comprising:
a. a first hook attached to the rope first end;
b. a clip having first and second holes with substantially parallel axes through the flat surface, the rope second end being fastened to the clip at the second clip hole, the first clip hole being adapted to slidably receive the rope intermediate the elastic sleeve and the second rope end to thereby form a loop in the rope portion extending between the first and second clip holes; and
c. a second hook slidably received over the loop in the rope portion extending between the first and second clip holes, the distance between the first and second hooks being adjustable by means of the clip independently of the tension in each sleeve to enable engaging the hooks with a load with the elastic sleeve in a relaxed condition and to enable stretching the sleeve and removing the rope slack therein to create a working length between the hooks equal to the length of the rope between the hooks, so that the load is retained only by the rope.

10. A rope adjustment device comprising a clip having a longitudinally extending flat plate portion with two longitudinally and laterally spaced holes through the plate portion and having parallel axes, the device having an upturned longitudinal flange and a spring finger joined to the longitudinal flange and projecting transversely over said plate portion to capture a rope therein and cooperating with said flange to confine said rope longitudinally on said plate.

* * * * *